Oct. 27, 1964 E. E. BITTMANN 3,154,766

MAGNETIC FILM NONDESTRUCTIVE READ-OUT

Filed March 6, 1959

INVENTOR.
ERIC E. BITTMANN

BY

Henry W. Kaufmann
AGENT 3,154,766

MAGNETIC FILM NONDESTRUCTIVE READ-OUT

Eric E. Bittmann, Downingtown, Pa., assignor to Burroughs Corporation, Detroit, Mich., a corporation of Michigan Filed Mar. 6, 1959, Ser. No. 797,693
9 Claims. (Cl. 340—174)

In my application for United States Patent Serial Number 728,212, filed April 14, 1958, entitled "Magnetic Data Store," I teach improved methods of using thin films or layers of ferromagnetic material to store data of binary form, describing in the course of those specifications also the prior art of employing such films or layers.

Particularly in the art of electrical computation and data handling and processing, it has been found desirable to store elements of information having two possible values by magnetizing in one of two possible senses a portion of ferromagnetic material having two substantially stable states. A relation between the value of the element of information and a sense of magnetization is arbitrarily established, and the ferromagnetic material is magnetized accordingly by known means. To determine in which sense the material has been left magnetized, it is conventional to apply to the material a strong magnetizing field, known as a reading or reading-out field, in a reference sense, which will be arbitrarily called the A sense. (The reference sense is sometimes referred to as the "zero" or the "one" sense by way of particularly close reference to possible binary arithmetic uses.) If the material was already magnetized in the A sense, the application of the reading field in that sense will produce only a small flux change in and about the material; but if the material was magnetized in the opposite sense, which will be called the B sense, application of the reading field in the A sense will produce a large flux change in the material by altering its magnetization from the B sense to the A sense. This large flux change may readily be observed by the voltages it induces in conductors suitably disposed around the ferromagnetic material. Conventional methods of thus reading out data obviously leave the material magnetized in the A sense, regardless of its sense of magnetization prior to the reading operation; and thus the sense of magnetization, which was indicative of the value of the stored data, has been rendered uninformatively uniform. The stored data has been destroyed. Methods are known for rewriting, or "regenerating" (in conventional trade parlance) the data when it is desired that it be available for reading out a second time; but this is not ordinarily more economical of time or equipment than the original writing operation, just as returning a book to a high shelf after consulting it takes only a little less effort than placing it there originally.

In application for United States Patent Serial Number 269,833, filed March 25, 1963, which is a continuation of Serial Number 782,914, by Robert L. Gray, Jr., filed December 24, 1958, entitled "Magnetic Data Store," which is assigned to the same assignee as this application, now abandoned, there is taught an ingenious principle for determining, non-destructively, the sense of magnetization of a ferromagnetic material by applying a reading field to only a portion of such ferromagnetic material; such portion being so small that the magnetizing field produced by the remainder of the ferromagnetic material is sufficient to assure that, upon removal of the reading field, the read portion will be magnetized in the same sense as the remainder. Thus reading out may be non-destructive of data. For the forms of ferromagnetic material which are substantially in the shape of long rods or tubes or similar extended shapes, it is possible to apply this principle by using relatively long solenoids to provide the magnetizing field which determines the sense of magnetization of the entire unit, and using relatively short solenoids to provide the reading field which affects the sense of magnetization of only a small portion of such a unit. The application of this principle to thin films or layers is not obvious, since such films are ordinarily driven by fields produced by passage of current through single conductors which do not have controllable lengths in the same sense that solenoids do. However, such thin films have many advantages of compactness, high operating speed, suitability for production and assembly by automatic means; and I have invented means for permitting the enjoyment of their previously known advantages together with the very considerable convenience and economy resulting from non-destructive reading out.

Thin films or layers of ferromagnetic material may be produced which have a preferred axis or direction of magnetization, and which may be stably magnetized in either one of the two possible senses along such an axis; and such films, particularly if thin, tend to undergo reversals of magnetization from one such stable state to the other by exhibiting a rotation of the direction of their magnetization, rather than by suffering a piecemeal change of individual domains from one sense of magnetization to the opposite, without rotation. In my previous application cited, I have taught beneficial ways of utilizing this particular characteristic of such ferromagnetic materials. This earlier invention employs a single conductor for the two purposes of applying a reading out field which rotates the direction of magnetization of a ferromagnetic element to a standard or reference state (different from either stable state) and of placing the ferromagnetic element in an unstable state from which it may readily be driven to either of the two stable states, as part of the writing operation. It is thus not taught by the methods I earlier disclosed to apply the writing fields to an entire ferromagnetic film or layer element, but to apply the reading out field to only a part of such element. The present invention teaches the use of separate conductors to provide the writing fields to an entire ferromagnetic element, and to apply the reading out field to only a part of such an element. In accordance with the general teachings of Gray, I rotate the direction of magnetization of only a part of the ferromagnetic element sufficiently small so that, upon removal of the reading out field, it will be rotated back to its original state by the field applied to it by the other unrotated parts of the element. Thus the reading out operation does not permanently alter the direction of magnetization of the ferromagnetic element, and it is therefore, by definition, non-destructive.

Thus one important object of my invention is to provide a data store which shall be economical, extremely fast, and require a minimum of auxiliary equipment for its operation.

Another important object of my invention is to provide a data store which shall be extremely compact and which shall not require bulky auxiliary equipment for regenerating signals read out.

Other objects and benefits of my invention will appear more particularly in the course of the detailed description and specification which follows infra.

For the better understanding of my invention I provide figures of drawing as follows.

Figure 1:
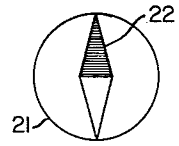
FIGURES 1, 2, 5, 6, 7 and 8 represent ideally various states of magnetization of a ferromagnetic element employed in the practice of my invention.
Figure 2:
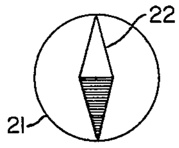
Figure 3:
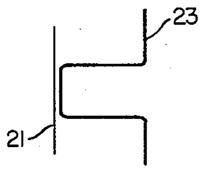
FIGURE 3 is a side representation of a ferromagnetic element and a magnetizing conductor employed in the practice of my invention.
Figure 4:
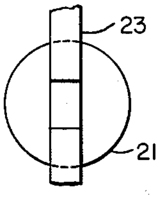
FIGURE 4 is a plan representation of the ferromagnetic element and the magnetizing conductor represented in FIGURE 3.
Figure 5:
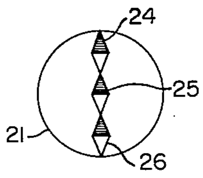
Figure 6:
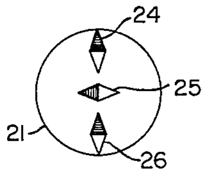
Figure 7:
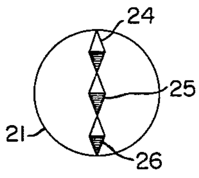

A typical thin film ferromagnetic element having a preferred direction of magnetization is represented in FIGURE 1; the arrow 22 having its upper half cross-lined (in imitation of the practice of darkening the north-seeking end of a compass needle) is employed to indicate that the element 21 is magnetized with an equivalent north pole upward, in FIGURE 1. FIGURE 2 represents the same element 21, but the orientation of arrow 22 indicates that the direction of magnetization of element 21 has been reversed. FIGURE 3 represents a side view, and FIGURE 4 a front view, of element 21 provided with an electrically conductive strip 23 which is shown to be in close proximity to element 21 only near its center. By well known physical principles, an electric current flowing from the lower part of conductor 23 (in FIGURES 3 and 4) to the upper part will produce a magnetizing field in element 21 directed toward the left of FIGURE 4; and this field will be much stronger in the immediate vicinity of the center of element 21, where conductor 23 approaches close to element 21, than it will at the peripheral areas of element 21 which are farther away from conductor 23. What has actually been observed concerning the behaviour of ferromagnetic film or layer elements under conditions like those represented in FIGURES 3 and 4 is consistent with the following explanation which is, however, recognized as being far too simple to describe all the complicated processes which occur in ferromagnetic materials at room temperature, when they are switched. The basic concept which employs miniature compass needles to represent the direction of magnetization of parts of a solid piece of ferromagnetic material will be recognized by those acquainted with the history of ferromagnetic theory as being due to Ewing, a writer of the last century. This description is therefore to be regarded rather as a mnemonic model to tie together observed facts than an attempt at physical description. FIGURE 5, then presents the element 21, magnetized as represented in FIGURE 1, but with the imaginary arrow 22 replaced by the three equally imaginary arrows 24, 25 and 26, each representing the direction of magnetization of the volume of element 21 in the immediate vicinity of the arrow. Particularly, central arrow 25 is intended to represent the direction of magnetization of the volume of element 21 which is subjected to a strong field from the current already hypothesized as flowing upward in conductor 23. FIGURE 6, therefore, represents the condition of magnetization prevailing in ferromagnetic film element 21 when the field from conductor 23 is applied by passage of current as described. It will be observed that arrow 25 has rotated approximately one quadrant counterclockwise and that arrows 24 and 26 are not displaced at all. Actually, the rotation of the magnetization of the volume represented by arrow 25 will be less than a quadrant, and that of the peripheral volumes represented by arrows 24 and 26 will be non-zero; but these approximations suffice for making clear the behaviour observed. It is evident that, as soon as the field from conductor 23 ceases (upon termination of the current through the conductor) the fields represented by arrows 24 and 26 will tend to rotate arrow 25 back to the position represented in FIGURE 5; and the experimental equivalent of this is in fact observed. FIGURE 7 represents film ferromagnetic element 21 in the state of magnetization represented in FIGURE 2; and the single arrow 22 has been replaced by arrows 24, 25, and 26 as in FIGURE 5, but with the difference that the arrows point to the bottom of FIGURE 7, the north-seeking ends of the arrows being considered the points.

Figure 8:
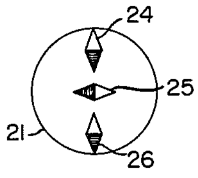
Figure 9:
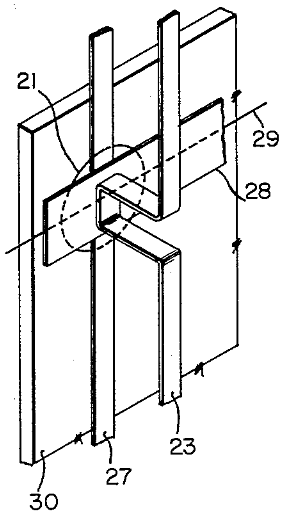
FIGURE 9 is a pictorial representation of a ferromagnetic element in relation to a typical arrangement of conductors, as employed in the practice of my invention.

If now a magnetizing field be applied to the left of element 21 by passage of current upward through conductor 23, arrow 25 will be rotated clockwise to the left as represented in FIGURE 8, through approximately but not exactly a quadrant, and the states of magnetization represented by arrows 24 and 26 will remain substantially, but not exactly, vertical and pointing downward. Upon removal of the field from conductor 23 by termination of the current in it, it is apparent that the field of arrows 24 and 26 will draw arrow 25 back to its original position, represented in FIGURE 7. It is apparent from the foregoing discussion that application of the same magnetizing field to the central part of element 21 will rotate the magnetization of that central part (represented by arrow 25) either counterclockwise or clockwise, depending upon the original direction of magnetization of the whole of element 21; and that in either case, the magnetization of the residual, peripheral parts of element 21 suffices to restore the entire element to its state prior to application of the reading field. It is apparent that there has been here demonstrated a means for applying a reading field to a restricted part of a thin film ferromagnetic element, such as to permit non-destructive readout. FIGURE 9 is a representation of a single unit of a ferromagnetic film element and the associated conductors needed to permit its employment in a data store suitable for easy use with conventional data handling or processing or computing devices.

FIGURE 9 represents a single ferromagnetic film or layer element 21 which is represented as a circle. The circle outlines the area of interest; but the functioning of the device will not be impaired if the physical material of the film is not confined to the area of the circle, but extends continuously even to another array of film element and conductors similar to that represented by FIGURE 9; all that is required is that the conductor array shall be sufficiently separated so that their effects upon one film element do not interfere with the effects of another conductor array upon another film element. In practice it has been found that it is possible to operate four film elements independently in a continuous oval strip one inch long and three sixteenths of an inch high, and two thousand Angstrom units thick. However, for most simple teaching of my invention, I represent the area of interest which constitutes a ferromagnetic element by a circle, recognizing that this may lie within the bounds of a larger physical film. All the conductors or portions of conductors which are intended to affect or be affected by the magnetization of the film element 21 are parallel to that film and in close proximity to the film. The preferred direction of magnetization of the film 21 is vertical in the figure, and lies substantially in the plane of the paper. The order or sequence in which the conductors lie in FIGURE 9 is: first, or closest to the film element 21, sense conductor 29 lying substantially normal to the preferred direction of magnetization of film element 21; write conductor 27 substantially parallel to the preferred direction of magnetization; information conductor 28 substantially normal to the preferred direction of magnetization and therefore substantially parallel to sense conductor 29; and read conductor 23, of which only a part is in close proximity to the other conductors and to the film element 21, but that part is substantially parallel to the preferred direction and thus to write conductor 27. A base 30 serves for support of the other items.

In an actually operative embodiment of this invention, the following dimensions were employed successfully. The ferromagnetic film element was a circle three-sixteenths of an inch in diameter, about 2000 Angstrom units thick, of nickel-iron alloy, formed by evaporation upon a glass base or substrate. Sense conductor 29 was an enamelled copper wire #36 American Wire Gauge, or five mils or thousandths of an inch in diameter. Write conductor 27 was a copper strip one-sixteenth of an inch wide and one one-thousandth inch thick. Information conductor 28 was three-sixteenths inch wide and one one-thousandth inch thick. Read conductor 23 was of material one-sixteenth of an inch wide, and one one-thousandth inch thick; the part in close proximity to the assembly of film element 21 and the other conductors was one-eighth of an inch long; the portions normal to the film element 21 were two inches long, thus keeping the major part of conductor 23 two inches away from the other conductors. Current in the write conductor 27 was 800 milliamperes; current in information conductor 28 was 400 milliamperes; current in read conductor 23 was 3 amperes. All pulses were approximately four-tenths microseconds long. The pulses induced in the sense conductor 29 were approximately two to five millivolts in amplitude. These currents naturally will depend upon the coercive force of the material of which element 21 is composed, and will also depend upon the spacing between each conductor and the ferromagnetic element 21. The rule governing the adjustment of the various currents is apparent from the theory of the device: Current in the information conductor 28 should be great enough to insure full switching of an element 21 when writing current is applied to write conductor 27, but insufficient to affect element 21 (even if applied repeatedly) in the absence of current in write conductor 27. Current in write conductor 27 should be adjusted to permit full switching of element 21 with a value of information current in information conductor 28 safely below the value which will by itself affect element 21. Current in read conductor 23 should be as high as possible consistent with absence of any destruction of a stable state by multiple repeated reading operations; this is desirable to maximize the output voltage induced in sense conductor 29.

Generally speaking, the positional order of the conductors with respect to the film element is not critical, provided all except 23 are spaced from the film element 21 by a distance which is small compared with the distance between the offset parts of conductor 23 and the film element, and provided also that the part of conductor 23 located adjacent to the central part of ferromagnetic film element 21 is within a distance from that element which is small compared with the distance from that element to the offset part of conductor 23.

Figure 10:
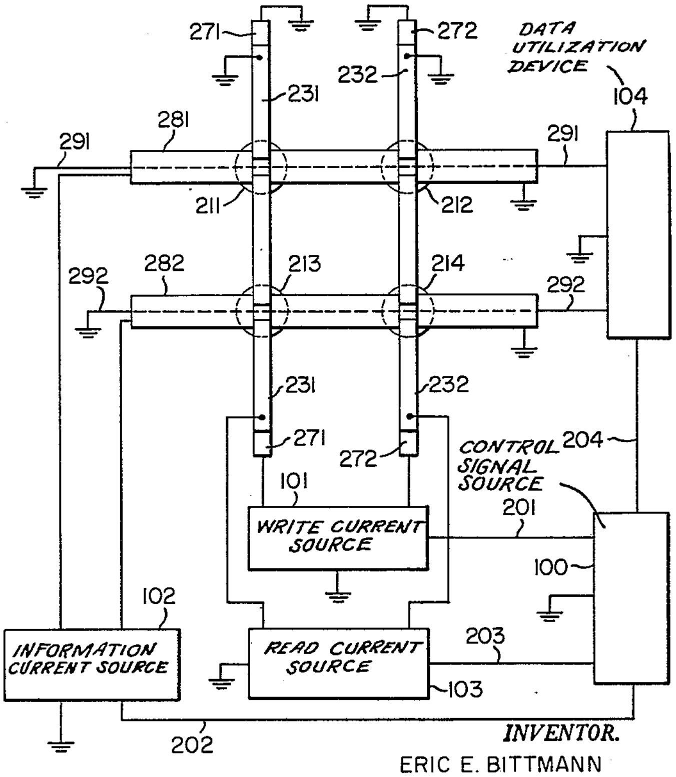
FIGURE 10 is a representation, partially in plan and partially schematic, of ferromagnetic storage elements with associated conductors and auxiliary equipment, arranged for illustrating the utilization of my invention.

FIGURE 10 represents four film elements 211, 212, 213, and 214, with conductor assemblies similar to the one such assembly represented in FIGURE 9, and auxiliary equipment connected to illustrate the use of my invention as a data store. The numbering system for designating the homologues of items represented in FIGURE 9 operates by the addition of a digit to the number employed in FIGURE 9; thus the homologues of item 21 of FIGURE 9 are numbered, in FIGURE 10, 211, 212, 213, and 214; similarly homologues of conductor 28 of FIGURE 9 are numbered, in FIGURE 10, 281 and 282.

Considering first the representation of FIGURE 9, it is apparent from standard physical knowledge that a current flowing upward in write conductor 27 will produce in ferromagnetic film element 21 a magnetizing field directed to the left of the figure; and amplitude of such a field which exceeds the coercive force of the material of film element 21 will cause the direction of magnetization of that element to rotate with the north seeking consequent poles directed to the left, and the direction of magnetization substantially horizontal and therefore approximately equidistant between the two stable positions represented by FIGURES 1 and 2. Ideally, in a perfectly symmetrical assembly, it would be a matter of pure chance to which stable sense the magnetization of film element 21 would fall upon termination of the current in write conductor 27; and it is true that a very small magnetizing field component directed either upward or downward at the time the coercive field from write conductor 27 is terminated will determine the direction in which the magnetization of ferromagnetic element 21 will come to rest. Such a field may be provided by current through information conductor 28; conventional current to the left of FIGURE 9 will produce a magnetizing field component directed downward in element 21, and conventional current to the right of FIGURE 9 through information conductor 28 will produce in ferromagnetic film element 21 a magnetizing field directed upward in the figure. Thus, as is described in more detail in my application entitled "Magnetic Data Store," referenced supra, it is possible to employ a relatively strong field from current passing in a single direction in the write conductor 27 to produce in the whole of ferromagnetic film or layer element 21 a condition of such magnetic instability that a relatively small or weak field from current passing in one of two possible directions through information conductor 28 can determine in which of two possible senses the magnetization of element 21 will become stable. It is particularly useful that it is only by the application of a field like that from the write conductor 27 that the field from information conductor 28 is enabled to affect the sense of stable magnetization of element 21, since (in FIGURE 10) it is apparent that writing current in write conductor 271 will permit current in information conductors 281 and 282 to appropriately affect the sense of stable magnetization of ferromagnetic elements 211 and 213, but not that of unselected elements 212 and 214.

In my application entitled "Magnetic Data Store," the conductor which performs the function here ascribed to the write conductor is designated as a read conductor, since it performs functions analogous to those of the read conductor 23 of the present conductor as well as to those of the write conductor 27 of the present application. Also, in that application the term "polarizing conductor" was used to designate the conductor which performs functions analogous to those of the information conductor 28 of the present application. Mature consideration has suggested that since, in the broad sense, any conductor providing (by current flowing in it) a magnetizing field performs what might be described as polarization, the term "information conductor" is at least as adequate as the former term, and may be slightly more readily assimilated by persons skilled primarily in the data handling and computing fields; the older term is rather the language of the physicist and electrical engineer.

It is apparent that rotation of the direction of magnetization of element 21 from either stable position (north pole up or down) to a horizontal position will induce a voltage in sense conductor 29, and that the polarity of the induced voltage will depend upon the initial stable position from which rotation begins. However, insofar as perfect symmetry is approximated, the induced voltages will have the same wave form and time of occurrence and duration and amplitude. The preceding observations concerning the induction of voltages in sense conductor 29 by the rotation of the direction of magnetization apply also to the rotation of the direction of magnetization of only a portion of ferromagnetic film element by passage of current through read conductor 23, which will, because of its geometry, apply a field exceeding the coercive field of element 21 only in a limited region central in element 21. However, the total flux linkage change produced will be less than for rotation of the direction of magnetization of the entire element 21, and the voltage induced will be proportionally reduced; but such a mode of operation has the very great advantage that the peripheral parts of the element 21, whose magnetization has been only slightly affected by the field from read conductor 23, will provide a field sufficient to restore the rotated central portion of element 21 to its condition previous to rotation, that is to parallelism with the direction of magnetization of the peripheral parts. Thus it is profitable to separate the writing and reading functions and assign them to two separate conductors to achieve non-destructive reading by the use of a specialized reading conductor.

FIGURE 10 represents ferromagnetic film or layer elements 211 and 212 traversed by sense conductor 291 and information conductor 281; and elements 213 and 214 traversed by sense conductor 292 and information conductor 282. Write conductor 271 and read conductor 231 traverse elements 211 and 213, and write conductor 272 and read conductor 232 traverse elements 212 and 214. In electrical computing and data processing and handling apparatus, it is conventional to achieve economy of apparatus by causing the same physical assemblies to perform functions as part of different logical entities at different times. The possible variations of such multi-function apparatus are limited only by the designer's ingenuity. For simplicity of explanation, I employ rectangles in FIGURE 10 to represent assemblies of apparatus to perform particular specified electrical (logical) operations; the known art (as exemplified inter alia in the publications of the Institute of Radio Engineers of New York City, New York, particularly the Transactions of the Professional Group on Electronic Computers; and in the book "Waveforms" volume 19 of the Radiation Laboratory Series published by the McGraw-Hill Book Company, Incorporated, of New York City, N. Y., and Toronto, Ontario, Canada, and London, England) teaches various ways of performing these functions. Rectangle 100 represents a source of control signals, which are applied selectively by channels represented as single lines (although they may be multiplicities of conductors in some or all cases) via channel 201 to write current source 101, via channel 202 to information current source 102, via channel 203 to read current source 103, and via channel 204 to data utilization device 104. The control signal source 100 will perform its directive or control function in accordance with the logical requirements of the gross operation to be performed by the data handling or processing or computing or analogous system which is to employ the present invention; consequently it is not possible to specify its functions in detail, except as they relate to the practice of the present invention.

Recording or writing of data is initiated by the transmission from control signal source 100 via channel 201 to write current source 101 of a signal which causes write current source to send through a selected write conductor (which will, for purposes of illustration be chosen as 271) to ground a pulse of conventional current sufficient in amplitude to produce a magnetizing field exceeding the coercive field of ferromagnetic film or layer elements 211 and 213, thus causing the direction of magnetization of these two elements to be rotated to the left of FIGURE 10. (It is to be assumed herein that any circuit described as involving ground is completed via ground to the current or voltage source.) Next control signal source 100 sends via channel 202 to information current source 102 a control signal which causes information current source 102 to apply to information conductor 281 a current pulse of polarity appropriate to the value of information to be stored in element 211, and to information conductor 282 a current pulse of polarity appropriate to the value of information to be stored in element 213. The write current pulse in write conductor 271 is then caused (either by the design of write current source 101 or by signal from control signal source over channel 201) to cease while the information current in information conductors 281 and 282 still flows. In the absence of a coercive field horizontally directed from write conductor 271, the magnetization of elements 211 or 213 will rotate to alignment with the fields from information conductors 281 or 282 respectively. It is a required characteristic of information current source 102 that it yield pulses which produce magnetizing fields insufficient to rotate the direction of magnetization of a ferromagnetic element (such as 212 and 214) which has not been moved from its stable state by a prior application of a coercive field from a write current in a write conductor such as 272. Thus in the case assumed, film elements 212 and 214 will be substantially unaffected by the information currents in information currents 281 and 282, respectively. It is apparent in the light of the foregoing that if write current had been applied to write conductor 272 the information currents would have altered the direction of stable magnetization of elements 212 and 214. Thus the selection among write conductors determines which elements will be altered in state of magnetization, and the sign of the information current determines what alteration shall take place. A current from information current source 102 through information conductor 281 to ground will, for example, rotate the magnetization of element 211 with the north pole upward; similarly, a current from ground through information conductor 282 to information current source 102 will rotate the magetization of element 213 with the north pole downward. The various rotations of flux by write and information currents will induce voltages in sense conductors 291 and 292, so that it is a necessary characteristic of data utilization device that it ignore or be unresponsive to voltages appearing on sense conductors 291 and 292 at the time of application of write and/or information currents.

Thus there has been described the operation of writing or recording data in a data store according to the present invention. Some forms of store employing destructive reading operations perform an operation known as "clearing" which amounts to recording all "zero" (or all "one") signals in all storage elements. Since reading in the store of FIGURE 10 is non-destructive, no such simple clearing operation is available, unless informaton current source 102 is provided with the ability to apply to all information conductors 281 and 282 uniform clearing current pulses so great that they unassisted produce at each ferromagnetic film or layer element 211, 212, 213, and 214 a field exceeding the coercive field of the elements, and thus rotate all the elements to a direction or sense corresponding to a cleared condition. A simple alternative to such a drastic operation is to clear by writing in all "zeros" or all "ones" into the elements which it is desired to clear.

The reading operation is initiated by the transmittal via channel 203 from control signal source 100 to read current source 103 of a signal which causes read current source 103 to apply to a selected read conductor (for example, 231) a read current pulse of such amplitude that it will rotate the direction of magnetization of a part only of film elements 211 and 213 in a given direction. The part of an element suffering such rotation must be a sufficiently small fraction of the whole element that, upon cessation of the reading field, the unrotated parts will be sufficient to restore the rotated part to its original orientation of magnetization without themselves suffering any permanent alteration of their own direction and intensity of magnetization. In order that data utilization device 104 may make use of the read signals, it is necessary that control signal source 100 transmit via channel 204 a control signal which will render data utilization device 104 sensitive to voltages induced on sense conductors 291 and 292 by the rotation of the central parts of the elements selected for reading (211 and 213, by the hypothesis of the example). It is an interesting fact that there is no necessary relation between the directions of the read current and of the write current; since the stable position of the magnetization of an element is either with the north pole down or with the north pole up, along a substantially vertical line in either case, a read plulse producing rotation to the left, or one producing rotation to the right will produce counterclockwise rotation for one original stable condition, i.e., one value of stored data, and clockwise rotation for the other original stable condition, i.e., the other value of stored data. Thus the sign of the change of flux linkages with the sense conductors 291 and 292 will differ depending upon the original stable direction of the element, and the voltage induced in sense conductor 291 or 292 during the rotation will differ similarly. Data utilization device 104 is, by specification, capable of interpreting the polarity of the voltages appearing upon the sense conductors 291 and 292 according to their indication of the remanent or stable sense of magnetization of the elements (281 and 282, in the assumption of the present example) being read. The reading operation has now been described; the reader skilled in the art will observe the extreme simplicity achieved by the application of my invention to eliminate any regeneration step for returning to the store data destroyed in reading out.

Since components of magnetizing fields may be added to produce a resultant different from either component in direction and magnitude, it is obvious in the light of the art that combinations of current-carrying conductors, or other sources of magnetizing fields, different from those here employed to teach the basic principles of non-destructively reading the content of very fast magnetic data stores, may be applied either by way of pointless difference, or to meet particular requirements. It is also obvious that the restricted portion of the ferromagnetic element subjected to the reading field need not be centrally located in the element, although such location has the advantage that the portion of the element read is provided with restoring fields on all sides, and is thus less subject to the effects of stray external fields and to its own demagnetizing effect. It is, of course, desirable that the sense conductor in a given embodiment be located so that the change in flux linkage with it produced by the reading rotation caused by application of the reading field will be maximized; ordinarily this requires that the sense conductor lie approximately centrally with respect to the reading field, although it is apparent that inhomogeneities or asymmetries in the element might alter even this fairly general rule.

Having described and represented the principles of my invention, outlined some of its advantages, and taught its use, I claim:

1. In a data store comprising substantially planar ferromagnetic layer storage elements of which each said element has a preferred direction of magnetization which is substantially the same throughout the element; sensing conductors adjacent to but not geometrically linked with said ferromagnetic storage elements; driving and writing conductors adjacent to but not geometrically linked with said ferromagnetic storage elements and adapted, by passage of electric currents through the said driving and writing conductors, to produce magnetizing fields to selectively rotate the direction of magnetization of the entirety of selected ones of said ferromagnetic storage elements to a predetermined stable position along said preferred direction of magnetization; the improvement which comprises a reading conductor, not geometrically linked with a said ferromagnetic storage element and adjacent to only a part thereof, to produce, by passage of electric current through the said reading conductor, a read-out magnetizing field to rotate the direction of magnetization of substantially only said part of the said ferromagnetic storage element from said predetermined stable position to a position transverse to said preferred direction of magnetization, the direction of magnetization of the remainder of said element contiguous to said part being substantially unaffected by said read-out magnetizing field, the magnetic field of said remainder of said element serving upon the termination of said read-out magnetic field to restore the direction of magnetization of said part to said predetermined stable position.

2. In a data store comprising a plurality of substantially planar ferromagnetic storage elements, each of which elements has a preferred direction of magnetization substantially the same throughout the element, each of which elements is provided with conductor means adjacent to but not geometrically linked with the said element for rotating the direction of magnetization of substantially the entire element to a predetermined stable position along said preferred direction of magnetization; each of which elements is further provided with means for detecting alterations in the direction of magnetization in the said element: the improvement which comprises read-out conductor means adjacent to a part of the said element for rotating the direction of magnetization only in said part of the said element from said predetermined stable position to a position transverse to said preferred direction of magnetization, the direction of magnetization of the remainder of said element contiguous to said part being substantially unaffected by said read-out means, the magnetic field of said remainder of said element serving to restore the direction of magnetization of said part to said predetermined stable position.

3. In a data store comprising a plurality of ferromagnetic storage elements of metallic films, each said element being substantially planar and having a preferred direction of magnetization substantially the same everywhere in the said element and substantially parallel to the plane of the said element; sense conductor means comprising, close to each said storage element, substantially parallel to the plane thereof, and substantially at right angles to the preferred direction of magnetization thereof, a segment of sense conductor; write conductor means comprising, close to each storage element, substantially parallel to the plane thereof, and substantially parallel to the preferred direction of magnetization thereof, a segment of write conductor extending completely across the said storage element; information conductor means comprising, close to each storage element, substantially parallel to the plane thereof, and substantially at right angles to the preferred direction of magnetization thereof, a segment of information conductor extending completely across the said storage element; the improvement comprising read conductor means comprising, for each said storage element, a segment of read conductor close to the said element, substantially parallel to the plane thereof, substantially parallel to the preferred direction of magnetization thereof, extending over only a portion of the maximum dimension of the said element parallel to the said segment, and provided at each end of the segment with a conductive connector extending normally to the plane of the said storage element to a location remote from the element.

4. In a data store comprising substantially planar ferromagnetic thin film storage elements each of which has a preferred direction of magnetization which is spatially oriented substantially the same throughout the element so that the remanent magnetization of such element is in substantially the said direction throughout the said element and the path of the flux of the said remanent magnetization is completed by return through space external to the said element; means for selectively rotating the direction of magnetization of substantially an entire said element to a predetermined stable position along said preferred direction of magnetization; and means for detecting the rotation of magnetization in a said element: the improvement which comprises read-out conductor means adjacent to a central part of the said element for rotating to an unstable position the direction of magnetization of only said central part of the said element, the direction of magnetization of the remainder of said element contiguous to said central part being substantially unaffected by said read-out means, the magnetic field of said remainder of said element serving to restore the direction of magnetization of said central part to said predetermined stable position.

5. In a thin-film magnetic memory in which magnetizing fields are selectively applied to substantially planar magnetically bistable thin-film storage elements by the passage of currents through conductors adjacent to but not geometrically piercing or linked with a said storage element, each of said storage elements having a preferred direction of magnetization substantially the same everywhere in the said element and substantially parallel to the plane of the said element, the improvement comprising a reading-out conductor having a segment closely adjacent to and parallel to the plane of a said storage element but extending over only a part of the maximum dimension of the said storage element parallel to the said segment, said segment of reading-out conductor being positioned substantially parallel to the preferred direction of magnetization of said storage element, the portions of the reading-out conductor adjacent to the said segment extending away from the plane of the element and serving to connect the said segment to a source of reading-out current pulses, the said source of reading-out current pulses being adapted to provide current pulses of controlled amplitude to create magnetizing fields of coercive intensity over substantially only said part of the said storage element, whereby the direction of magnetization of only said part of said element is rotated from a predetermined stable magnetic position to a position transverse to said preferred direction of magnetization, the direction of magnetization of the remainder of said element contiguous to said part being substantially unaffected by the magnetizing field created by said reading-out current pulses, the magnetic field of said remainder of said element serving to restore the direction of magnetization of said part to said predetermined stable position.

6. A data store comprising, in combination, a storage element in the form of a magnetically bistable thin film disposed in a single plane and having a preferred direction of magnetization substantially the same everywhere in the element and substantially parallel to the plane thereof; writing conductor means adjacent to the element and extending parallel thereacross and adapted by passage of electrical current therethrough to produce magnetizing fields to selectively rotate the direction of magnetization of the entirety of the storage element; sense conductor means adjacent to the element and extending parallel thereacross at right angles to the preferred direction of magnetization thereof and operable to detect the rotation of magnetization in the element; a reading-out conductor for applying a magnetizing field to a part of the element to rotate the direction of magnetization thereof, said reading-out conductor being so shaped as to provide a segment thereof parallel to the plane of the element and closely adjacent to only a part of the storage element and effective by passage of electric current therethrough to produce a magnetizing field to rotate the direction of magnetization of substantially only said part of the element to a magnetically unstable position; the direction of magnetization of the balance of said element contiguous to said part being substantially unaffected by the magnetizing field created by current flow through said reading-out conductor, said sensing conductor means detecting said rotation of the magnetization of said part of the element by the current in the reading-out conductor and the magnetic field of the balance of said element serving to restore the direction of magnetization of said part to a stable direction of magnetization.

7. A data store comprising, in combination, a storage element in the form of a magnetically bistable thin film disposed in a single plane and exhibiting a general circular formation, the magnetization of the element having a preferred orientation substantially the same everywhere in the element and substantially parallel to the plane thereof; writing conductor means adjacent to the element and extending parallel thereacross and adapted by passage of electrical current therethrough to produce magnetizing fields to selectively rotate the direction of magnetization of the entirety of the storage element; sense conducor means adjacent to the element and extending parallel thereacross at right angles to the preferred direction of magnetization thereof and operable to detect the rotation of magnetization in the element; a reading-out conductor for applying a magnetizing field to a portion of the element to rotate the direction of magnetization thereof, said reading-out conductor being so shaped as to provide a segment thereof parallel to the plane of the element and closely adjacent to the central portion thereof and effective by passage of electric current therethrough to produce a magnetizing field to rotate the direction of magnetization of only said central portion of the element to a magnetically unstable position; said sensing conductor means detecting said rotation of the magnetization of said central portion of the element by the current in the reading-out conductor and the magnetization of the annular portion of the element surrounding the central portion acting to restore the direction of magnetization of the latter to a stable orientation of magnetization.

8. A data store comprising: at least one substantially planar ferromagnetic storage element having two different stable states of magnetization and a preferred direction along which magnetization corresponds to the said two stable states; a dense conductor and an information conductor adjacent to said ferromagnetic storage element and substantially parallel to the plane of said element and substantially normal to the said preferred direction; a drive conductor substantially parallel to the plane of said ferromagnetic storage element and adjacent to said ferromagnetic storage element and substantially parallel to said preferred direction; means including said information and drive conductors for causing substantially said entire storage element to assume a predetermined stable magnetic state; a reading-out conductor having a first portion only substantially parallel to the plane of the said ferromagnetic storage element and adjacent to a portion only of said ferromagnetic storage element and substantially parallel to said preferred direction, and having, continuous with said first portion, second portions extending away from the plane of the said ferromagnetic storage element at right angles thereto for conveying electric current to and from the said first portion without applying significant magnetizing fields to portions of the said storage element relatively remote from the said first portion; means for causing read current flow through said reading-out conductor, said read current producing a magnetizing field of sufficient intensity to rotate the direction of magnetization of substantially only said portions of said storage element from said predetermined stable magnetic state to an unstable state, the magnetic state of the remainder of said element contiguous with the said portion of said element being substantially unaffected by the magnetizing field produced by said read current, the magnetic field of the remainder of said element serving upon the cessation of read current flow to restore said portion of said element to said predetermined stable state.

9. A data store comprising: at least one substantially planar ferromagnetic storage element having two different stable states of magnetization and a preferred direction along which magnetization corresponds to the said two stable states; a sense conductor and an information conductor adjacent to said ferromagnetic storage element and substantially parallel to the plane of said element and substantially normal to the said preferred direction; a drive conductor substantially parallel to the plane of said ferromagnetic storage element and adjacent to said ferromagnetic storage element and substantially parallel to said preferred direction; means including said information and drive conductors for causing substantially said entire storage element to assume a predetermined stable magnetic state; a reading-out conductor having a first portion only substantially parallel to the plane of the said ferromagnetic storage element and adjacent to a portion only of said ferromagnetic storage element and substantially parallel to said preferred direction, and having connected at each end additional conductors for bringing electric current to and removing it from the said reading-out conductor, the said additional conductors being directed away from the plane of the said ferromagnetic storage element substantially at right angles thereto, means for causing read current flow through said reading-out conductor, said read current producing a magnetizing field of sufficient intensity to rotate the direction of magnetization of substantially only said portion of said storage element from said predetermined stable magnetic state to an unstable state, the magnetic state of the remainder of said sorage element contiguous with the said portion of said element being substantially unaffected by the magnetizing field produced by said read current, the magnetic field of the remainder of said element serving upon the cessation of read current flow to restore said portion of said element to said predetermined stable state.

References Cited in the file of this patent

UNITED STATES PATENTS

| | | |
|---|---|---|
| 2,811,652 | Lipkin | Oct. 29, 1957 |
| 2,842,755 | Lamy | July 8, 1958 |
| 2,938,183 | Dillon | May 24, 1960 |
| 3,030,612 | Rubens et al. | Apr. 17, 1962 |

FOREIGN PATENTS

| | | |
|---|---|---|
| 515,232 | Canada | Aug. 2, 1955 |
| 1,190,683 | France | Oct. 14, 1959 |

OTHER REFERENCES

"Magnetization Reversal and Thin Films," D. O. Smith, Journal of Applied Physics, March 1958, vol. 29, No. 3, pp. 264–273.